United States Patent
Matsushita

(10) Patent No.: US 11,268,571 B2
(45) Date of Patent: Mar. 8, 2022

(54) TAPERED ROLLER BEARING FOR AUTOMOBILE

(71) Applicant: NTN CORPORATION, Osaka (JP)

(72) Inventor: Tomoki Matsushita, Shizuoka (JP)

(73) Assignee: NTN CORPORATION, Osaka (JP)

( * ) Notice: Subject to any disclaimer, the term of this patent is extended or adjusted under 35 U.S.C. 154(b) by 564 days.

(21) Appl. No.: 16/319,605

(22) PCT Filed: Jun. 29, 2017

(86) PCT No.: PCT/JP2017/023981
§ 371 (c)(1),
(2) Date: Jan. 22, 2019

(87) PCT Pub. No.: WO2018/020951
PCT Pub. Date: Feb. 1, 2018

(65) Prior Publication Data
US 2021/0301867 A1    Sep. 30, 2021

(30) Foreign Application Priority Data

Jul. 26, 2016  (JP) .............................. JP2016-146151

(51) Int. Cl.
*F16C 19/36* (2006.01)
*F16C 33/36* (2006.01)
*F16C 19/38* (2006.01)

(52) U.S. Cl.
CPC .......... *F16C 19/364* (2013.01); *F16C 33/366* (2013.01); *F16C 19/385* (2013.01);
(Continued)

(58) Field of Classification Search
CPC ...... F16C 19/364; F16C 19/385; F16C 33/36; F16C 33/366
See application file for complete search history.

(56) References Cited

U.S. PATENT DOCUMENTS 6,390,685 B1    5/2002  Shimomura et al.
8,858,088 B2 *  10/2014 Fujiwara ................. F16C 33/36
                                                     384/568
(Continued)

FOREIGN PATENT DOCUMENTS

JP   2001-107952   4/2001
JP   2005-155763   6/2005
(Continued)

OTHER PUBLICATIONS

International Preliminary Report on Patentability dated Jan. 29, 2019 in International (PCT) Application No. PCT/JP2017/023981.
(Continued)

*Primary Examiner* — James Pilkington
(74) *Attorney, Agent, or Firm* — Wenderoth, Lind & Ponack, L.L.P.

(57) ABSTRACT

A tapered roller bearing for an automobile includes an inner ring including a raceway surface having a tapered shape on an outer periphery, an outer ring including a raceway surface having a tapered shape on an inner periphery, a plurality of tapered rollers incorporated into a space defined between the raceway surfaces, and a retainer configured to receive the tapered rollers. The inner and outer rings are each made of carburized steel, and the raceway surfaces of the inner and outer rings each have a straight generating line shape. The tapered rollers each are made of high carbon chromium bearing steel, and each have a rolling surface including a straight portion, which is formed at a center portion in an axial direction, and crowning portions, which extend from the straight portion to both end portions. The crowning portions are each formed of logarithmic crowning.

3 Claims, 5 Drawing Sheets

(52) U.S. Cl.
CPC ...... *F16C 2204/66* (2013.01); *F16C 2223/12* (2013.01); *F16C 2326/06* (2013.01)

(56) References Cited

U.S. PATENT DOCUMENTS

| | | | |
|---|---|---|---|
| 2006/0204157 A1 | 9/2006 | Takemura | |
| 2007/0127860 A1 | 6/2007 | Toda et al. | |
| 2012/0033909 A1 | 2/2012 | Fujiwara | |
| 2019/0076977 A1* | 3/2019 | Higashi | .................. B24B 35/00 |

FOREIGN PATENT DOCUMENTS

| | | |
|---|---|---|
| JP | 3731401 | 1/2006 |
| JP | 2006-234087 | 9/2006 |
| JP | 2007-51714 | 3/2007 |
| JP | 2007-170418 | 7/2007 |
| JP | 2010-106974 | 5/2010 |
| JP | 2010-255730 | 11/2010 |
| JP | 2011-208751 | 10/2011 |
| JP | 2012-107693 | 6/2012 |
| JP | 5037094 | 9/2012 |
| JP | 2014-52069 | 3/2014 |
| WO | 2004/092603 | 10/2004 |

OTHER PUBLICATIONS

International Search Report dated Sep. 5, 2017 in International (PCT) Application No. PCT/JP2017/023981.
Chinese Office Action dated Dec. 24, 2019 in corresponding Chinese Patent Application No. 201780042851.4 with English translation of Search Report.
Extended European Search Report dated May 25, 2020 in corresponding European Patent Application No. 17833960.2.

* cited by examiner

TAPERED ROLLER BEARING FOR AUTOMOBILE

The present application is a U.S. National Phase Application of International (PCT) Application No. PCT/JP2017/023981, filed on Jun. 29, 2017, which claims priority to Japanese Application No. 2016-146151, filed on Jul. 26, 2016.

TECHNICAL FIELD

The present invention relates to a tapered roller bearing for an automobile, and more particularly, to a tapered roller bearing for an automobile which is to be suitably used for a transmission or a differential of an automobile.

BACKGROUND ART

With regard to a tapered roller bearing for an automobile to be used for, for example, a transmission or a differential, in order to deal with application of a large load or misalignment, it is required that a contact stress which is generated on raceway surfaces (including rolling surfaces of rollers) of the tapered roller bearing be suppressed to an appropriate magnitude. In order to set a contact surface pressure (edge surface pressure) on the raceway surfaces of the tapered roller bearing to fall within an appropriate range, it is required that crowning be formed. Specifically, attempts have been made with various methods such as a method of forming crowning in each of an inner ring, an outer ring, and rollers and a method of forming large crowning or logarithmic crowning only in the rollers.

Among those methods, as a method which is capable of attaining the most appropriate contact surface pressure and minimizing the stress generated inside the raceway surface to extend a bearing lifetime, there have been proposed, in Patent Document 1, a logarithmic crowning function, which is obtained by modifying the Johns-Gohar's function through introduction of three design parameters thereto, and a roller bearing.

Moreover, according to Patent Document 2, with regard to a crowning shape for attaining an appropriate surface pressure, a range of a crowning drop amount at each of two points of a roller in a generating line direction from a center of a rolling element or a raceway ring is defined irrespective of the crowning shape. Further, according to Patent Document 3, there has been proposed a method of forming logarithmic crowning in a roller and forming logarithmic crowning also in any one of an inner ring and an outer ring.

PRIOR ART DOCUMENTS

Patent Documents

Patent Document 1: JP 5037094 B2
Patent Document 2: JP 3731401 B2
Patent Document 3: JP 2010-106974 A

SUMMARY OF THE INVENTION

Problems to be Solved by the Invention

When crowning is to be formed, in consideration of ease of processing and cost, it is preferred that single-curve crowning or logarithmic crowning having a large drop amount be formed in the rolling surfaces of the tapered rollers being rolling elements. Further, in consideration of ease of processing and cost, it has been found out that it is also preferred that the raceway surfaces of the inner ring and the outer ring each have a single-curve crowning shape having a small drop amount or a straight shape having no crowning shape.

In usage of the tapered roller bearing, there is a case in which the tapered roller bearing is used with strong interference fitting. Therefore, it is preferred that carburized steel be used as a material of the raceway ring. Moreover, carburized steel is used also for the rollers.

However, in consideration of a case in which crowning is formed only in the rolling surfaces of the tapered rollers, it is required that a large drop amount be given. The increase in drop amount leads to increase in grinding amount. As a result, there arises a problem in that a heat-treated hardened layer for a top layer which is applied to attain a long lifetime becomes shallower. The present invention focuses on this problem.

In view of the problem described above, the present invention has an object to provide a tapered roller bearing for an automobile, which is capable of achieving suppression of a contact surface pressure and increase in lifetime at low cost.

Solution to the Problems

As a result of various studies having been conducted to achieve the object described above, the inventor of the present invention has arrived at the present invention based on an idea in terms of processing, that is, forming logarithmic crowning only in the rolling surfaces of the tapered rollers and an idea in terms of a material, that is, preventing degradation of an effect of thermal treatment applied to achieve increase in lifetime.

As a technical measure for achieving the above-mentioned object, according to one embodiment of the present invention, there is provided a tapered roller bearing for an automobile, comprising: an inner ring comprising a raceway surface having a tapered shape on an outer periphery; an outer ring comprising a raceway surface having a tapered shape on an inner periphery; a plurality of tapered rollers incorporated into a space defined between the raceway surfaces; and a retainer configured to receive the plurality of tapered rollers, wherein the inner ring and the outer ring are each made of carburized steel, wherein the raceway surfaces of the inner ring and the outer ring each have a straight generating line shape, wherein the tapered rollers each are made of high carbon chromium bearing steel, wherein the tapered rollers each have a rolling surface comprising: a straight portion, which is formed at a center portion in an axial direction; and crowning portions, which extend from the straight portion to both end portions, and wherein the crowning portions are each formed of logarithmic crowning.

With the configuration described above, suppression of the contact surface pressure in the tapered roller bearing for an automobile and the increase in lifetime can be achieved at low cost.

Herein, terms described in Description and Claims are defined as follows. The term "automobile" refers to "vehicle including a motor and a steering device and being capable of traveling on the ground with use of those components while a passenger rides on the vehicle" as defined in JIS D 0101-1993. As representatives of the automobile, there are given, for example, a passenger car, a bus, a truck, an all-terrain vehicle (ATV), a motorcycle, a construction vehicle, and an industrial vehicle. A tapered roller bearing for such automobile generally has an outer-ring outer diameter of from about φ50 mm to about φ150 mm. Moreover, the term "logarithmic crowning" refers to, in addition to crowning having a logarithmic curve, crowning which is approximated to a logarithmic curve including a plurality of arcs having different curvature radii which are smoothly connected. Further, the term "straight generating line shape" of the raceway surface refers to, in addition to a linear generating line shape, a substantially linear generating line shape with crowning having a drop amount of several micrometers.

It is preferred that a ratio Dr/Dw of a drop amount Dr of the crowning portion of the rolling surface described above to a roller diameter Dw fall within a range of from 0.003 to 0.03. With this, the edge surface pressure can be set to an appropriate value.

The tapered roller bearing for an automobile according to one embodiment of the present invention is to be suitably used for, in particular, a transmission or a differential.

Effects of the Invention

According to the present invention, suppression of the contact surface pressure in the tapered roller bearing for an automobile and increase in lifetime of the tapered roller bearing can be achieved at low cost.

EMBODIMENTS OF THE INVENTION

With reference to FIG. 1 to FIG. 5, description is made of a tapered roller bearing for an automobile (hereinafter simply referred to also as "tapered roller bearing") according to one embodiment of the present invention. First, with reference to FIG. 1, description is made of an outline of a speed changer for an automobile (transmission for an automobile) for which the tapered roller bearing according to this embodiment is used.

Figure 1:
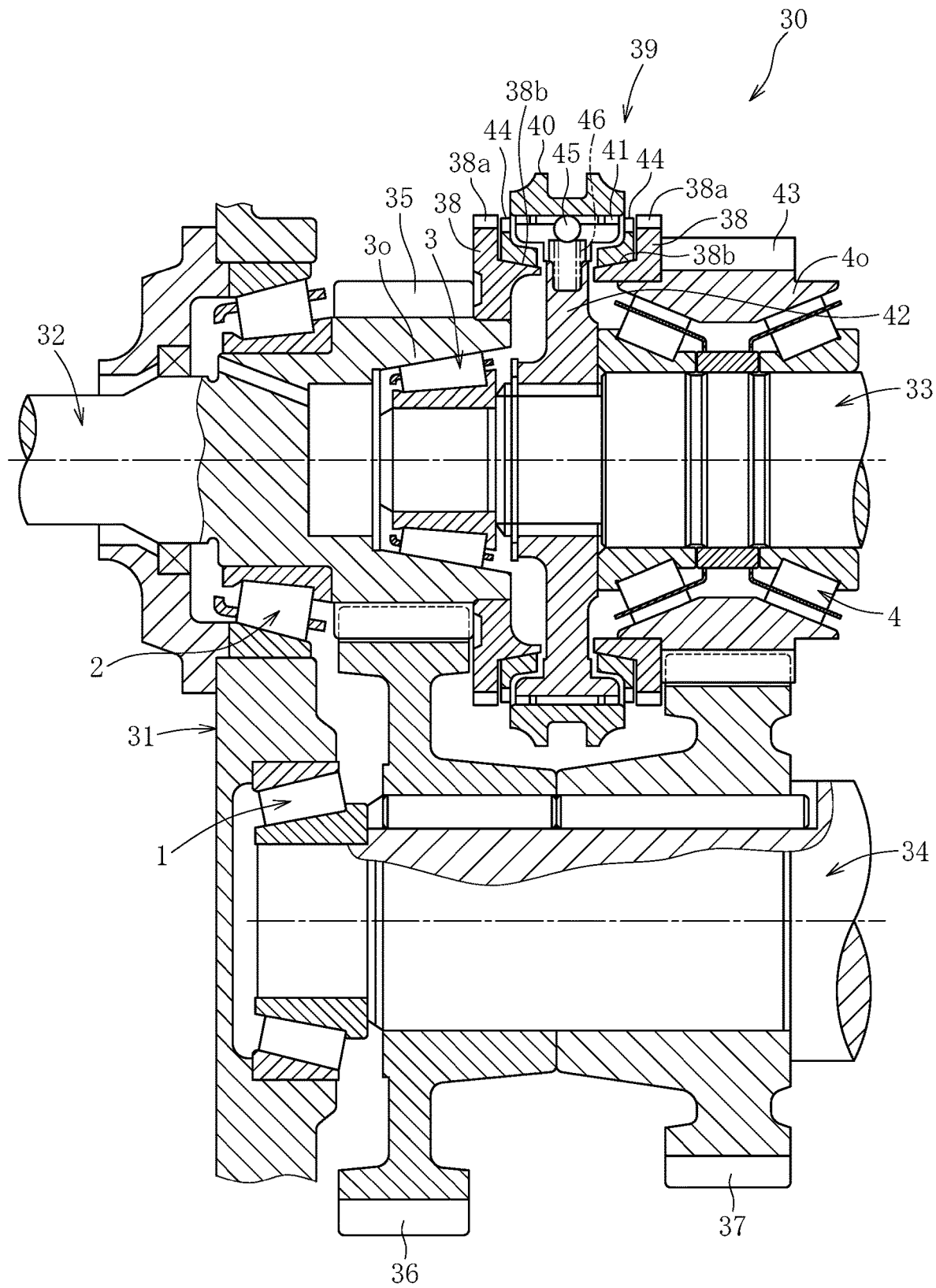
FIG. 1 is a vertical sectional view for illustrating a part of a speed changer for an automobile for which a tapered roller bearing for an automobile according to one embodiment of the present invention is used.

FIG. 1 is a vertical sectional view for illustrating main parts of an example of a speed changer for an automobile to which the tapered roller bearing according to this embodiment is mounted. This speed changer 30 is a synchromesh speed changer. An input shaft 32 is supported so as to be rotatable by a mission case 31 through intermediation of a tapered roller bearing 2, and a main shaft 33 is arranged coaxially with the input shaft 32. The input shaft 32 and the main shaft 33 are supported so as to be relatively rotatable by a tapered roller bearing 3 at a pilot portion. Although illustration is omitted, other parts of the main shaft 33 are also supported by tapered roller bearings. An auxiliary shaft 34 which is arranged so as to be parallel to the input shaft 32 and the main shaft 33 and apart therefrom by a predetermined distance is supported so as to be rotatable by the mission case 31. The auxiliary shaft 34 is supported by a tapered roller bearing 1 and another tapered roller bearing (not shown). The input shaft 32 has an input shaft gear (hereinafter simply referred to also as "gear") 35 formed integrally therewith, and always meshes with an auxiliary shaft gear (hereinafter simply referred to also as "gear") 36 of the auxiliary shaft 34.

Moreover, a main shaft gear (hereinafter simply referred to also as "gear") 43 is mounted to the main shaft 33 so as to be rotatable through intermediation of a tapered roller bearing 4 at an idler portion. The main shaft gear 43 always meshes with a gear 37 of the auxiliary shaft 34. The tapered roller bearing for an automobile according to this embodiment corresponds to each of the tapered roller bearings 1 to 4 and other tapered roller bearings (not shown). Among the tapered roller bearings, the tapered roller bearing 3 at the pilot portion comprises an outer ring 30 being a component also serving as the gear 35, and the tapered roller bearing 4 at the idler portion comprises an outer ring 40 being a component also serving as the gear 43. The outer ring 30 and the outer ring 40 also correspond to the outer ring described in Description and Claims.

A dog clutch 38 is coupled to a portion of the input shaft 32 adjacent to the gear 35. The dog clutch 38 integrally has dog teeth 38a and a cone 38b. The dog teeth 38a are formed on an outer periphery of the dog clutch 38. The cone 38b has a conical shape and is formed on one side of the dog clutch 38. A synchronization mechanism 39 is arranged close to the dog clutch 38. Similarly to the gear 35 of the input shaft 32, another dog clutch 38 is coupled to a portion of the main shaft 33 adjacent to the gear 43. The dog clutch 38 integrally has dog teeth 38a and a cone 38b. The dog teeth 38a are formed on an outer periphery of the dog clutch 38. The cone 38b has a conical shape and is formed on one side of the dog clutch 38. The synchronization mechanism 39 is arranged close to the dog clutch 38.

The synchronization mechanism 39 comprises a sleeve 40, a synchronizer key 41, a hub 42, synchronizer rings 44, a pressing pin 45, and a spring 46. The sleeve 40 moves in an axial direction (right-and-left direction in FIG. 1) by actuation of a selector (not shown). The synchronizer key 41 is mounted to an inner periphery of the sleeve 40 so as to be movable in the axial direction. The hub 42 is engaged with and coupled to an outer peripheral surface of the main shaft 33. The synchronizer rings 44 are slidably mounted to outer peripheral surfaces of the cones 38b of the dog clutches 38. The pressing pin 45 and the spring 46 are configured to elastically press the synchronizer key 41 toward an inner periphery of the synchronizer key 41.

In the state illustrated in FIG. 1, the sleeve 40 and the synchronizer key 41 are held at a neutral position by the pressing pin 45. When the sleeve 40 moves toward the right side in the axial direction from the state illustrated in FIG. 1 by actuation of the selector, the synchronizer key 41 follows the sleeve 40 to move toward the right side in the axial direction and press the synchronizer ring 44 against an inclination surface of the cone 38b of the dog clutch 38. With this, the rotation speed of the dog clutch 38 is reduced, whereas the rotation speed on the synchronization mechanism 39 side is increased. When both rotation speeds are synchronized, the sleeve 40 further moves to the right side in the axial direction, and the synchronizer key 41 is caused to mesh with the dog teeth 38a of the dog clutch 38. As a result, the main shaft gear 43 and the main shaft 33 are coupled to each other through intermediation of the synchronization mechanism 39. With this, the rotation of the auxiliary shaft gear is transmitted to the main shaft gear 43, and hence the main shaft 33 rotates with a predetermined transmission gear ratio. Reversely, when the sleeve 40 moves toward the left side in the axial direction from the state illustrated in FIG. 1, the input shaft 32 and the main shaft 33 are coupled to each other through intermediation of the synchronization mechanism 39, and hence the main shaft 33 rotates at a rotation speed as high as that of the input shaft 32. In such a manner, a gear shift operation is performed.

Figure 2:
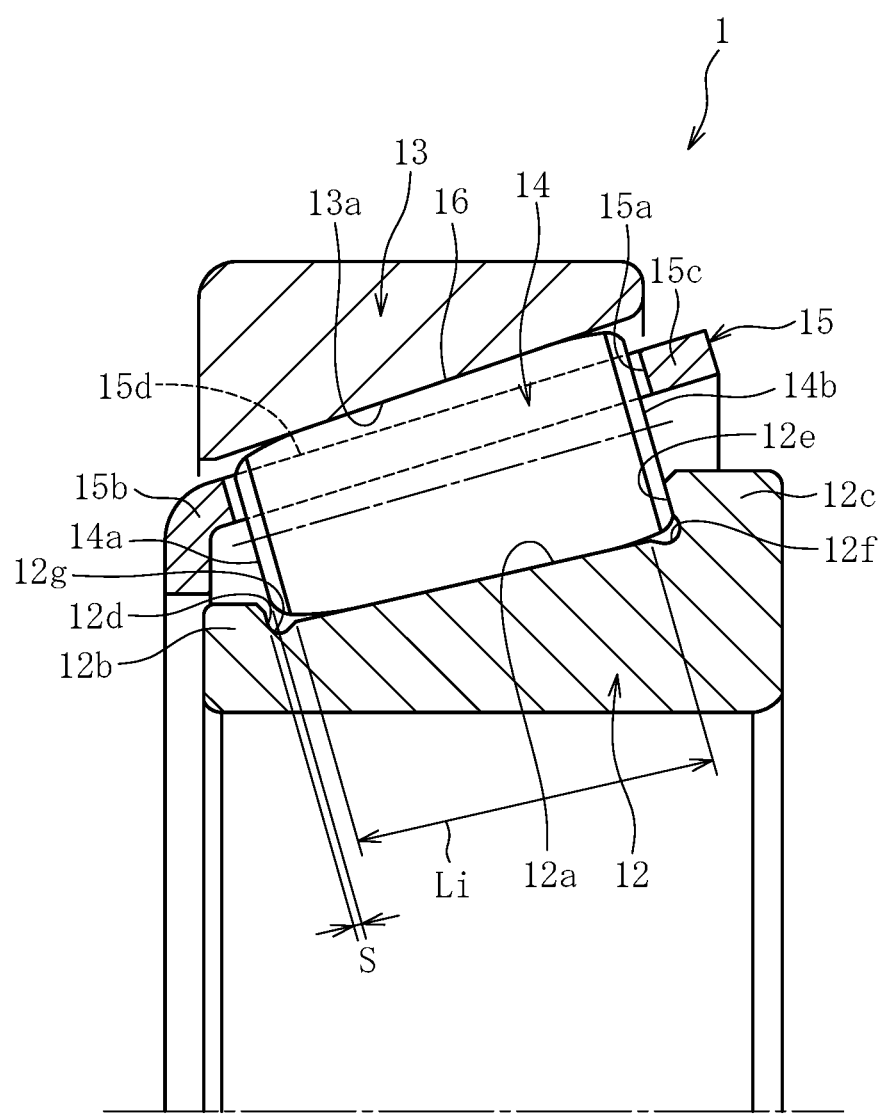
FIG. 2 is a vertical sectional view of the tapered roller bearing for an automobile according to one embodiment of the present invention.

Next, with reference to FIG. 2 to FIG. 5, detailed description is made of the tapered roller bearing according to this embodiment. FIG. 2 is a vertical sectional view for illustrating an upper half from a center line of the tapered roller bearing according to this embodiment. Description is made of the tapered roller bearing 1 configured to support the auxiliary shaft 34 in FIG. 1 as an example. The tapered roller bearings 2 to 4 are the same as the tapered roller bearing 1, and hence description thereof is omitted.

As illustrated in FIG. 2, the tapered roller bearing 1 comprises an inner ring 12, an outer ring 13, tapered rollers 14, and a retainer 15. The tapered rollers 14 are incorporated between the inner ring 12 and the outer ring 13. The retainer 15 is configured to retain the tapered rollers 14. The inner ring 12 has a raceway surface 12a, a small-flange portion 12b, and a large-flange portion 12c. The raceway surface 12a has a tapered shape and is formed on an outer periphery of the inner ring 12. The small-flange portion 12b is formed on a small-diameter side. The large-flange portion 12c is formed on a large-diameter side. The outer ring 13 has a raceway surface 13a. The raceway surface 13a has a tapered shape and is formed on an inner periphery of the outer ring 13. The plurality of tapered rollers 14 are incorporated between the raceway surface 12a of the inner ring 12 and the raceway surface 13a of the outer ring 13. The tapered rollers 14 are received in pockets 15a of the retainer 15 and are retained at equal intervals in a circumferential direction.

A ground relief portion 12f is formed at a corner portion at which the raceway surface 12a of the inner ring 12 and a large-flange surface 12e of the large-flange portion 12c intersect each other. A ground relief portion 12g is formed at a corner portion at which the raceway surface 12a and a small-flange surface 12d of the small-flange portion 12b intersect each other. A generating line of the raceway surface 12a extending in the axial direction is linearly formed. Moreover, a generating line of the raceway surface 13a of the outer ring 13 extending in the axial direction is also linearly formed. The raceway surface 12a of the inner ring 12 has the ground relief portions 12f and 12g. Thus, an effective raceway surface width Li of the raceway surface 12a is smaller than an effective rolling surface width Le (see FIG. 3) of a rolling surface 16 of the tapered roller 14 having a roller length L. The contact surface pressure becomes more disadvantageous by such difference.

Figure 3:
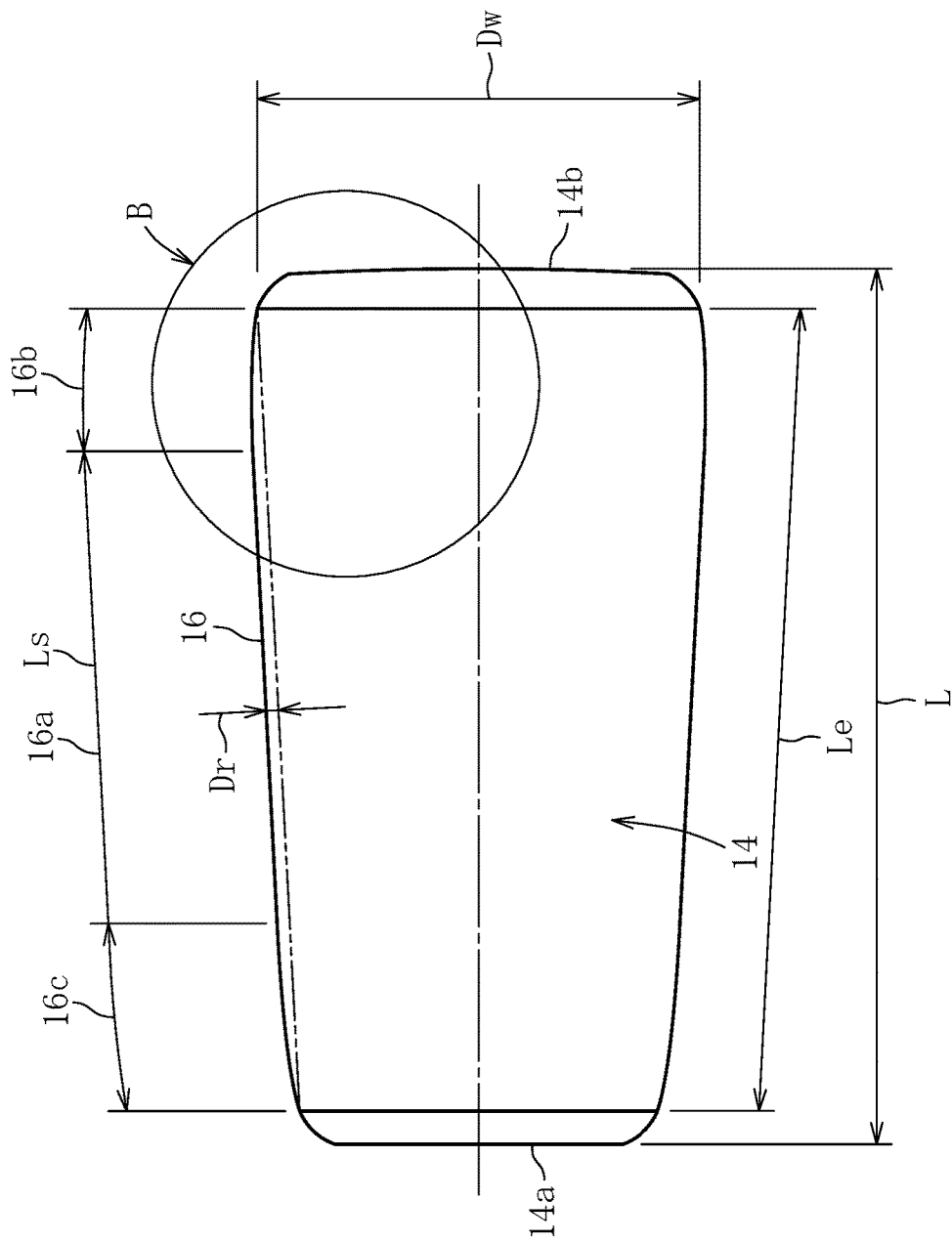
FIG. 3 is an enlarged front view of a tapered roller of FIG. 2.

The rolling surface 16 having a tapered shape is formed on an outer periphery of the tapered roller 14. A small end surface 14a is formed on the small-diameter side, and a large end surface 14b is formed on the large-diameter side. The large end surface 14b of the tapered roller 14 is received on the large-flange surface 12e of the inner ring 12. As illustrated in FIG. 3, the rolling surface 16 of the tapered roller 14 comprises a straight portion 16a and crowning portions 16b and 16c. The straight portion 16a is formed at a center portion in the axial direction. The crowning portions 16b and 16c are formed at both end portions in the axial direction. In FIG. 3, the drop amount of each of the crowning portions 16b and 16c is illustrated with emphasis. The crowning portions 16b and 16c are described later in detail. As illustrated in FIG. 2, the retainer 15 comprises a small-diameter side annular portion 15b, a large-diameter side annular portion 15c, and a plurality of columnar portions 15d connecting the small-diameter side annular portion 15b and the large-diameter side annular portion 15c to each other in the axial direction.

Figure 4:
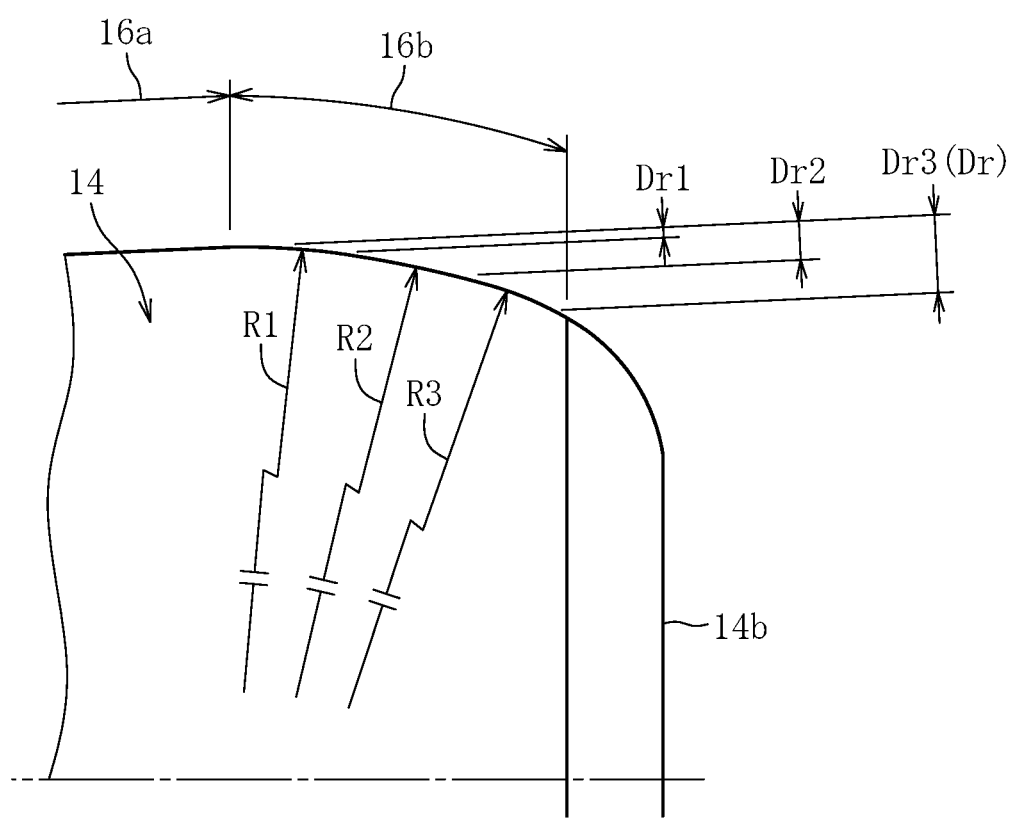
FIG. 4 is an enlarged view for illustrating the portion B of FIG. 3.

The outline of the tapered roller bearing according to this embodiment is as described above. Next, with reference to FIG. 2 to FIG. 4, description is made of a characteristic configuration of the tapered roller bearing according to this embodiment. FIG. 3 is an enlarged front view of the tapered roller of FIG. 2. FIG. 4 is an enlarged view for illustrating the portion B of FIG. 3. The characteristic configuration of the tapered roller bearing according to this embodiment is achieved based on a combination of an idea in terms of processing, that is, forming the logarithmic crowning only in the rolling surfaces of the tapered rollers and an idea in terms of a material, that is, preventing degradation of an effect of thermal treatment applied to achieve increase in lifetime. The raceway surfaces of the inner ring and the outer ring being the raceway rings each have a straight generating line shape, and carburized steel is used as a material of the inner ring and the outer ring. Moreover, the logarithmic crowning is formed only in the rolling surfaces of the tapered rollers being the rolling elements, and high carbon chromium bearing steel is used as a material of the tapered rollers.

As illustrated in FIG. 2, the raceway surface 12a of the inner ring 12 and the raceway surface 13a of the outer ring 13 each have a straight generating line shape. In this embodiment, the raceway surface 12a and the raceway surface 13a each having the linear generating line shape are illustrated as an example. However, not limited to this, a substantially linear generating line shape with single-curve crowning having a small drop amount of about 5 μm (middle protruding shape) and a small curvature may be given.

The inner ring 12 and the outer ring 13 are each made of carburized steel such as chromium steel (for example, SCR435) or chromium molybdenum steel (for example, SCM435). Although illustration is omitted, the top surfaces of the raceway surface 12a of the inner ring 12 and the raceway surface 13a of the outer ring 13 each have a quench-hardened layer formed by carburizing, quenching, and tempering, and has a surface hardness of from about HRC 58 to about HRC 63. An effective hardened-layer depth of the quench-hardened layer in each of the raceway surfaces 12a and 13a after grinding falls within a range of from 0.3 mm to 0.5 mm or larger. The raceway surfaces 12a and 13a each have a straight generating line shape. Therefore, the grinding amount is small, and hence the effective hardened-layer depth of a required amount can be secured even after grinding. With this, a bearing function is secured, and the raceway surfaces 12a and 13a are applicable to a usage involving strong interference fitting. The effective hardened-layer depth generally falls within a range of equal to or larger than Hv 513 (HRC 50).

In the tapered roller bearing 3 at the pilot portion and the tapered roller bearing 4 at the idler portion illustrated in FIG. 1, the outer rings 30 and 40 are components serving also as the gears 35 and 43, respectively. However, also in this case, carburized steel is used, and carburizing, quenching, and tempering are performed.

The chromium steel and the chromium molybdenum steel are given as examples of the carburized steel. However, not limited to those, there may be employed, for example, a 5120 material, a 4118 material, an 8620 material, a 4320 material, and a 9310 material conforming to ASTM A534 standard, as corresponding materials.

As illustrated in FIG. 3, the rolling surface 16 of the tapered roller 14 comprises the straight portion 16a at a center portion in the axial direction and the crowning portions 16b and 16c at both end portions in the axial direction. The crowning portions 16b and 16c each have logarithmic crowning. A width Ls of the straight portion 16a of the rolling surface 16 of the tapered roller 14 is set so as to fall within a range of from 50% to 85% of the effective rolling surface width Le. Therefore, skew can be suppressed, and the contact surface pressure can be reduced. Further, ease of processing is excellent, and hence manufacturing cost can be reduced.

In terms of a material, the tapered roller 14 is made of high carbon chromium bearing steel (for example, SUJ2). The tapered roller 14 is entirely hardened from the top surface to the inside by entire quenching (through-hardening) and has a uniform hardness of from about HRC 58 to about HRC 63. Therefore, even when the grinding amount is large due to formation of the logarithmic crowning having a large drop amount, the quenching hardness of the rolling surface 16 of the tapered roller 14 can be kept, and the bearing function can be maintained. With this, the tapered roller bearing for an automobile according to this embodiment can suppress the contact surface pressure and achieve long lifetime at low cost.

As high carbon chromium bearing steel other than SUJ2, there may be also employed SUJ3 or SUJ5. Alternatively, as a corresponding material, there may be employed, for example, a 52100 material conforming to the ASTM A295 standard or a Grade 1 material or a Grade 2 material conforming to the ASTM A485 standard.

Now, description is made of the logarithmic crowning. The generating line of each of the crowning portions 16b and 16c is determined based on a logarithmic curve of logarithmic crowning expressed by the following expression. This logarithmic crowning expression is cited from Japanese Patent No. 5037094 applied by the applicant of the present application.

$$z(y) = K_1 A \ln \frac{1}{1 - \left\{1 - \exp\left(-\frac{z_m}{K_1 A}\right)\right\}\left(\frac{y-a}{K_2 a} + 1\right)^2} \qquad \text{[Expression 1]}$$

A: $=2Q/\pi l E'$
a: Length from an original point O to an end of an effective contact portion
E': Equivalent elastic modulus
$K_1$: Parameter representing a degree of a curvature of crowning
$K_2$: Parameter representing a ratio of crowning length with respect to "a"
l: Length of an effective contact portion in a generating line direction
Q: Load
y: Position of the contact portion in the generating line direction
z(y): Drop amount at an axial position "y"
$z_m$: Parameter representing an optimum value of a maximum drop amount of crowning at an end in an effective length of a roller The design parameters $K_1$, $K_2$, and $z_m$ in the logarithmic crowning expression described above are subjected to design. Description is made of a mathematical optimization method for the logarithmic crowning. Through determination of the design parameter $K_2$ and appropriate selection of $K_1$ and $z_m$ in the function expression expressing the logarithmic crowning, optimum logarithmic crowning can be designed. In general, the crowning is designed so as to reduce the surface pressure of the contact portion or a maximum value of stress. It is assumed that the rolling fatigue lifetime occurs in accordance with the von Mises yield criterion, and the parameters $K_1$ and $z_m$ are selected so as to minimize a maximum value of the von Mises equivalent stress. The parameters $K_1$ and $z_m$ can be selected with use of an appropriate mathematical optimization method. Various algorithms for mathematical optimization methods have been proposed, and the direct search method as one example is capable of executing optimization without use of derivatives of function, and is effective for a case in which an objective function and variables cannot be directly expressed with use of expressions. In this case, the parameters $K_1$ and $z_m$ are determined with use of the Rosenbrock method as one of direct search methods.

The shape of each of the crowning portions 16b and 16c of the tapered roller 14 in this embodiment is the logarithmic curve crowning determined by the expression described above. However, the shape is not limited to that determined by the expression described above, but the logarithmic curve may be determined with use of another logarithmic crowning expression.

The crowning portions 16b and 16c of the tapered roller 14 illustrated in FIG. 3 each have crowning having a shape approximated to the logarithmic curve of the logarithmic crowning determined by the expression described above. With reference to FIG. 4, description is made of details of the crowning portion 16b formed on the large end surface 14b side of the tapered roller 14. In FIG. 4, for easy understanding of the drop amount of the crowning portion 16b, more emphasis is given as compared to the tapered roller 14 illustrated in FIG. 3. The crowning portion 16b has a complex arc shape formed by smoothly connecting three arcs having large curvature radii R1, R2, and R3 to the straight portion 16a. As the drop amounts of the crowning portion 16b, there are defined a drop amount Dr1 at a first gate, an intermediate drop amount Dr2 at a second gate, and a maximum drop amount Dr3 at a third gate so that the crowning shape approximated to the logarithmic curve is formed. The drop amount Dr3 corresponds to Dr in Description and Claims. Moreover, the drop amount Dr3 corresponds to $z_m$ in Expression 1 described above. With this, surface pressure distribution in the axial direction can be set uniform while avoiding the edge surface pressure. The drop amount depends on the size or the model number, but is about 60 μm at maximum. The crowning portion 16c formed in the small end surface 14a is similar to the crowning portion 16b, and hence description thereof is omitted. The straight portion of the rolling surface of the tapered roller described in Description and Claims is referred to as a portion having a linear shape and a portion having a substantially linear shape with crowning having a drop amount of about several micrometers.

Regions of the crowning portions 16b and 16c opposed to the ground relief portions 12f and 12g of the inner ring 12 of FIG. 2 are not brought into contact with the inner ring 12. It is not always required that the raceway surface 16 of the tapered roller 14 in this region have the logarithmic crowning, and this region may be the linear shape, the arc shape, or other shape by which the crowning portions 16b and 16c are smoothly connected to each other. With this, the grinding amount is suppressed, and the processing efficiency of the roller is improved, thereby being capable of reducing the manufacturing cost.

A gap S, which is illustrated in FIG. 2, between the small end surface 14a of the tapered roller 14 and the small-flange surface 12d is set so as to be equal to or smaller than 0.3 mm. Therefore, the effect of suppressing skew can be attained. Further, the adapting rotation performed at the time of assembly of the tapered roller bearing 1 is reduced, thereby improving ease of assembly.

Next, description is made of the following issue. That is, as a specification for a large load, the tapered roller 14 in the tapered roller bearing 1 according to this embodiment is made of high carbon chromium bearing steel, and with such configuration, even when the drop amount of the crowning is increased, there arises no problem in terms of a bearing function and in terms of processing. In the tapered roller 14 illustrated in FIG. 3, a ratio Dr/Dw of the drop amount Dr of the crowning portion 16b, 16c of the rolling surface 16 to a roller diameter Dw falls within a range of from 0.003 to 0.03. Verification results thereof are shown in Table 1.

TABLE 1

| Roller diameter Dw [mm] | φ10 | φ10 | φ15 | φ20 | φ10 | φ10 |
|---|---|---|---|---|---|---|
| Crowning drop amount Dr of roller [mm] | 0.015 | 0.030 | 0.060 | 0.100 | 0.3 | 0.4 |
| Crowning drop amount Dr of roller/roller diameter Dw | 0.0015 | 0.003 | 0.004 | 0.005 | 0.03 | 0.04 |
| Contact surface pressure | x | ○ | ○ | ○ | ○ | ○ |
| Influence on lifetime | ○ | ○ | ○ | ○ | ○ | ○ |
| Ease of processing | ○ | ○ | ○ | ○ | ○ | x |
| Determination | x | ○ | ○ | ○ | ○ | x |

As shown in Table 1, when the ratio Dr/Dw of the crowning drop amount Dr of the roller to the roller diameter Dw is smaller than 0.003, the contact surface pressure (edge surface pressure) becomes larger, with the result that there is difficulty in practical use. Meanwhile, it was verified that, when the ratio Dr/Dw is larger than 0.03, there is difficulty in manufacturing. Based on the verification results described above, when the ratio Dr/Dw is set within the range of from 0.003 to 0.03, the edge surface pressure can be set to an appropriate value. Moreover, ease of processing is excellent, and hence the manufacturing cost can be reduced.

Meanwhile, description is made of verification results of a related-art tapered roller bearing given in the course of development. In the related-art tapered roller bearing, the inner ring and the outer ring being the raceway rings and the tapered rollers being rolling elements are subjected to carburizing, quenching, and tempering with carburized steel. Then, as a specification for a large load, cut crowning is formed in the raceway surfaces of the inner ring and the outer ring, and full crowning (single-curve crowning having a drop amount of about several micrometers) is formed in the rolling surfaces of the tapered rollers. In order to reduce the edge surface pressure, a large drop amount is required for the raceway surfaces of the inner ring and the outer ring due to application of the cut crowning. In order to reduce the edge surface pressure, the cut crowning requires a drop amount of from about 15 μm to about 30 μm for the inner ring. Moreover, in a case of application to the outer ring, the raceway surface width is longer than the rolling surface of the tapered roller. Thus, a larger drop amount is required, and hence is set to from about 50 μm to about 100 μm.

When the crowning drop amount of the related art is given only to the tapered roller, a large drop amount is required. For example, when the roller diameter is φ20 mm, a drop amount of about 0.1 mm is required. However, when the grinding of 0.1 mm is performed, there is a fear in that the quench-hardened layer depth of the carburized steel causes the lifetime to be shortened. Therefore, a relationship between each roller diameter and a crowning drop amount of the roller was verified. The verification results are shown in Table 2.

TABLE 2

| Roller diameter Dw [mm] | φ10 | φ10 | φ15 | φ20 | φ20 or larger |
|---|---|---|---|---|---|
| Crowning drop amount Dr of roller [mm] | 0.015 | 0.030 | 0.060 | 0.100 | 0.3 |
| Crowning drop amount Dr of roller/roller diameter Dw | 0.0015 | 0.003 | 0.004 | 0.005 | 0.03 |
| Contact surface pressure | x | ○ | ○ | ○ | ○ |
| Influence on lifetime | ○ | ○ | ○ | x | x |
| Ease of processing | ○ | ○ | ○ | ○ | x |
| Determination | x | ○ | ○ | x | x |

As shown in Table 2, when the crowning drop amount Dr was set to 0.015 mm in the tapered roller having a roller diameter of φ10 mm, the edge surface pressure causing an adverse effect was generated, with the result that the determination result of "not applicable" was given. Moreover, in the tapered roller having a roller diameter of larger than φ20 mm, the crowning drop amount Dr became excessively larger. Thus, the hardened layer depth after grinding became smaller with the quench-hardened layer depth of the carburized steel, with the result that the determination result of "not applicable" was given.

As a result of various studies conducted based on the verification results of the related-art tapered roller bearing described above, based on the idea in terms of processing, that is, forming the logarithmic crowning only in the rolling surfaces of the tapered rollers and the idea in terms of a material, that is, preventing degradation of an effect of thermal treatment applied to achieve increase in lifetime, the inventor of the present invention has arrived at the tapered roller bearing for an automobile according to this invention having the following configuration. That is, the raceway surfaces of the inner ring and the outer ring being the raceway rings each have a straight generating line shape, and carburized steel is used as a material of the inner ring and the outer ring. Moreover, the logarithmic crowning is formed only in the rolling surfaces of the tapered rollers being the rolling elements, and high carbon chromium bearing steel is used as a material of the tapered rollers.

Figure 5:
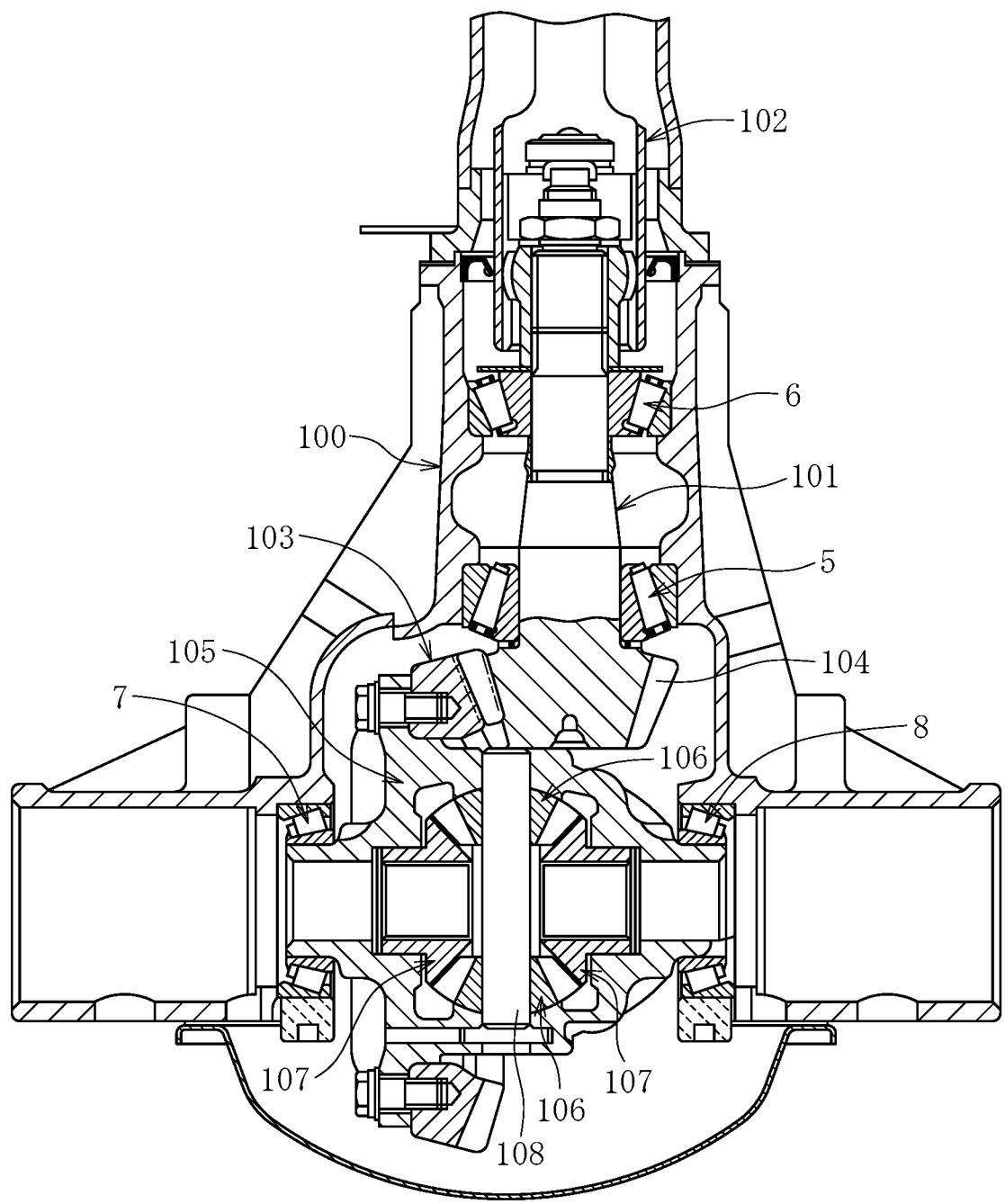
FIG. 5 is a vertical sectional view for illustrating a differential for which the tapered roller bearing for an automobile according to one embodiment of the present invention is used.

Next, with reference to FIG. 5, description is made of a differential for an automobile to which the tapered roller bearing for an automobile according to this embodiment is applied. FIG. 5 is a vertical sectional view of a general differential for an automobile. A drive pinion shaft 101 is received on an input side of a differential case 100, and is supported by a pair of tapered roller bearings 5 and 6 so as to be rotatable. A propeller shaft 102 is coupled to one end portion of the drive pinion shaft 101, and a drive pinion gear (deceleration small gear) 104 which meshes with a link gear (deceleration large gear) 103 is integrally provided to another end portion of the drive pinion shaft 101.

The link gear 103 is coupled to a differential gear case 105, and the differential gear case 105 is supported by a pair of tapered roller bearings 7 and 8 so as to be rotatable relative to the differential case 100. A pair of pinion gears 106 and a pair of side gears 107, which mesh with the pair of pinion gears 106, are arranged inside the differential gear case 105. The pinion gears 106 are mounted to a pinion shaft 108, and the side gears 107 are mounted to the differential gear case 105. Right and left drive shafts (not shown) are coupled (for example, by serration coupling) to radially inner portions of the side gears 107. The tapered roller bearing for an automobile according to this embodiment corresponds to each of the tapered roller bearings 5 to 8 described above.

Drive torque of the propeller shaft 102 is transmitted through the drive pinion gear 104, the link gear 103, the differential gear case 105, the pinion gears 106, the side gears 107, and the drive shafts in the stated order.

Similarly to the tapered roller bearing 1 described above, also in each of the tapered roller bearings 5 to 8, the raceway surfaces of the inner ring and the outer ring being the raceway rings each have a straight generating line shape, and carburized steel is used as a material of the inner ring and the outer ring. Moreover, the logarithmic crowning is formed only in the rolling surfaces of the tapered rollers being the rolling elements, and high carbon chromium bearing steel is used as a material of the tapered rollers. Specific configurations and operations and effects of the tapered roller bearings 5 to 8 are similar to those of the tapered roller bearing 1. Thus, the description as to the tapered roller bearing 1 is similarly applied, and description thereof is omitted.

The present invention is not limited to the above-mentioned embodiment. As a matter of course, the present invention may be carried out in various modes without departing from the spirit of the present invention. The scope of the present invention is defined in claims, and encompasses equivalents described in claims and all changes within the scope of claims.

The invnetion claimed is:

1. A tapered roller bearing for an automobile, the tapered roller bearing comprising:
    an inner ring comprising a raceway surface having a tapered shape on an outer periphery;
    an outer ring comprising a raceway surface having a tapered shape on an inner periphery;
    a plurality of tapered rollers incorporated into a space defined between the raceway surfaces; and
    a retainer configured to receive the plurality of tapered rollers,
    wherein the inner ring and the outer ring are each made of carburized steel,
    wherein the raceway surfaces of the inner ring and the outer ring each have a straight generating line shape,
    wherein the tapered rollers each are made of high carbon chromium bearing steel,
    wherein the tapered rollers each have a rolling surface comprising:
        a straight portion, which is formed at a center portion in an axial direction; and
        crowning portions, which extend from the straight portion to both end portions,
    wherein the crowning portions are each formed of logarithmic crowning, and
    wherein, for each of the tapered rollers, a ratio Dr/Dw of a drop amount (Dr) of the crowning portions of the rolling surface to a roller diameter (Dw) falls within a range of from 0.003 to 0.03.

2. An automobile comprising a transmission, the transmission including the tapered roller bearing according to claim 1.

3. An automobile comprising a differential, the differential including the tapered roller bearing according to claim 1.

* * * * *